United States Patent
Baumgartner et al.

(10) Patent No.: US 6,191,077 B1
(45) Date of Patent: Feb. 20, 2001

(54) METHOD OF CLEANING LIQUID COOLING LUBRICANTS

(75) Inventors: Reinhard Baumgartner, Munich; Karl-Guenther Bremer, Eschweiler, both of (DE); Rudi Bungenberg, Eupen (BE); Walter Janning, Maitenbeth (DE); Joachim Panhans, Puchheim (DE); Eduard Rauscher, Pfaffenhofen (DE)

(73) Assignees: Bayerische Motoren Werke Aktiengesellschaft, Munich; Filterwerk Mann & Hummel GmbH, Ludwigsburg, both of (DE)

(*) Notice: Under 35 U.S.C. 154(b), the term of this patent shall be extended for 0 days.

(21) Appl. No.: 09/380,749
(22) PCT Filed: Mar. 12, 1998
(86) PCT No.: PCT/EP98/01451
§ 371 Date: Dec. 23, 1999
§ 102(e) Date: Dec. 23, 1999
(87) PCT Pub. No.: WO98/40148
PCT Pub. Date: Sep. 17, 1998

(30) Foreign Application Priority Data

Mar. 13, 1997 (DE) .............................. 197 10 257

(51) Int. Cl.⁷ .............................................. C10M 175/00
(52) U.S. Cl. ........................... 508/111; 208/179; 208/180
(58) Field of Search ............................................. 508/111

(56) References Cited

U.S. PATENT DOCUMENTS

| 3,954,602 | * | 5/1976 | Troesch et al. | 208/179 |
| 4,264,436 | * | 4/1981 | Shim | 208/180 |
| 4,357,243 | * | 11/1982 | Dobrez et al. | 210/752 |
| 4,492,636 | * | 1/1985 | Burke | 210/706 |
| 4,789,460 | * | 12/1988 | Tabler et al. | 208/180 |
| 5,154,828 | * | 10/1992 | Schneider et al. | 210/501 |
| 5,968,371 | * | 10/1999 | Verdegan et al. | 210/739 |

FOREIGN PATENT DOCUMENTS

| 211282 | * | 7/1984 | (DE) . |
| 35 37 384 A1 | * | 4/1987 | (DE) . |
| WO 98/40148 | * | 9/1998 | (WO) . |

OTHER PUBLICATIONS

PCT/EP98/01451, (Filterwerk Mann and Hummel GMBH), European Search Report and International Preliminary Examination Report, Mar. 1999.*

* cited by examiner

Primary Examiner—Ellen M. McAvoy
(74) Attorney, Agent, or Firm—Evenson, McKeown, Edwards & Lenahan, P.L.L.C.

(57) ABSTRACT

A method of cleaning mineral-oil-based liquid cooling lubricants in which the cooling lubricants, which are continuously circulated in metal-working plants, are cleaned by a deposition filtration system. A continuous or discontinuous inoculation or introduction of filtering aid material is carried out in the filtration circuit during the filtration of the liquid cooling lubricant.

7 Claims, 1 Drawing Sheet

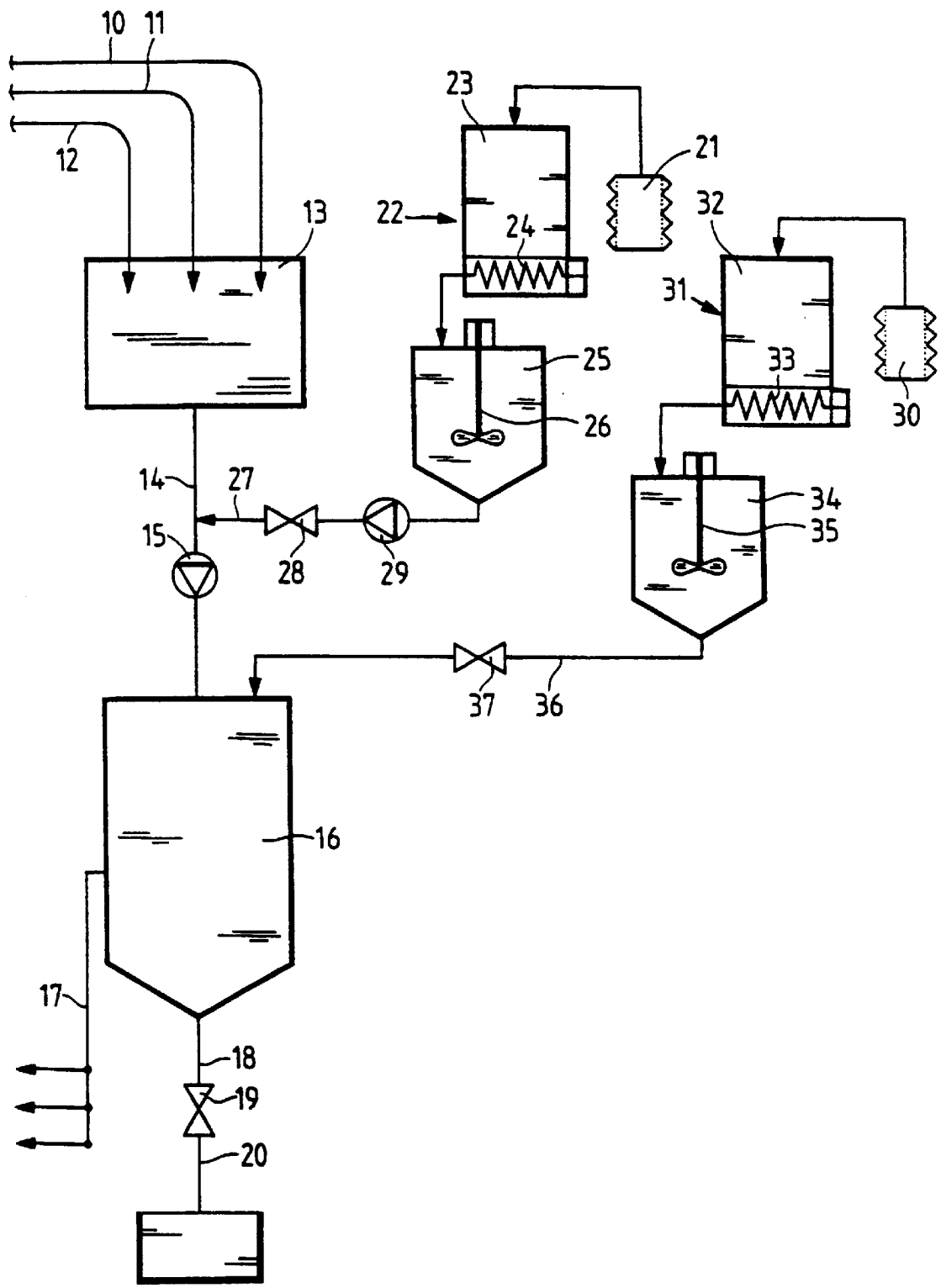

METHOD OF CLEANING LIQUID COOLING LUBRICANTS

BACKGROUND OF THE INVENTION

The invention relates to a method for cleaning liquid cooling lubricants, especially those with a mineral-oil base, which preferably are in continuous circulation in metal-processing facilities, in which a deposition filtration system is provided.

Above all, liquid oil-based or emulsion-based cooling lubricants are used in metal-cutting facilities which cut off chips to cool and to lubricate cutting locations and to carry off abraded particles formed as a result. The liquid cooling lubricant is in continuous circulation, and to supply several metal-processing machines, the liquid cooling lubricant is re-introduced through a central supply facility into the individual machines.

To achieve ideal cross-sectional images of the workpiece, it is necessary to clean the liquid cooling lubricant after use. For this reason, continuously operating cleaning facilities are included in the circuit in which facilities the used cooling lubricant is freed, above all, from solid abraded metal particles by means of sedimentation facilities, magnets, or filters.

Deposition filters, in which a suspension is formed from the cooling lubricant together with a filtering aid and thereafter filtered through a carrier web with deposition of the filtering aid, are used especially for the extra-fine purification of the mineral-oil-based cooling lubricant.

Such a process is known from DE 25 37 384. In this process, highly surface-active, adsorbing, solid substances are used as filtering aids. Activated earth which has an average particle size of less than 0.06 mm is particularly preferred.

Systems are also known as deposition filters which work by deposition of internally-produced contamination. However, these processes do not offer a sufficient cleaning under high performance requirements. Under normal circumstances, therefore, filtering aids are deposited in a separate circuit before the actual filtration occurs by means of the interconnected second circuit. The contaminated oil or contaminated emulsion, which has been contaminated by grits and grinds, metal filings, or other types of contamination such as rolling scale or draw-in scale, travels from the metal-cutting machines or machine tools through a dirt return line into a dirty liquid buffer container. From there, the dirty liquid is conveyed via filter pumps through cartridge filters, in the process of which the contamination accumulates on the cartridges and forms a filter cake of dirt.. The oil purified by means of the filter cartridges travels into a clean tank and is once again transported from there to the machines or to sites of use.

One disadvantage of the known methods is that large quantities of the filtering aids are necessary. Disposal of these filtering aids is extremely difficult because this involves toxic substances which have to be disposed of following special disposal techniques. In addition, the filtration intervals are of relatively short duration since the filtering aid layer very quickly becomes loaded with the absorbed contamination, so only small amounts of liquid can be filtered.

SUMMARY OF THE INVENTION

It is the object of the invention to avoid the aforementioned disadvantages and to provide a method for cleaning liquid cooling lubricants in which the use of filtering aids is reduced and the filtration intervals are lengthened.

This object is achieved by the invention as described and claimed herinafter.

The substantial advantage of the invention is that the filtering aids are introduced into to the filter circuit in the form of an inoculation which takes place continuously or discontinuously. This has the advantage that the porosity of the deposits on the filter cartridges is increased and accordingly, the exposure time, i.e. the filtration interval, can be lengthened. In addition, this system provides the possibility of very precisely metering the amount of filtering aid applied and of increasing the quality of the filtration by means of the flow resistance of the liquid through the filtering medium.

One embodiment of the invention is designed so that the inoculation occurs by means of supplying the filtering aid in the contaminated liquid feed. The inoculation can thereby be performed directly in front of the deposition filter. In this way it is possible to achieve short flow paths for the filtering aid. It is also possible to carry out the introduction of the filtering medium on the suction side of the pump for the contaminated liquid. In this way, the pressure required for introduction is reduced.

In accordance with another embodiment of the invention, the inoculation is regulated in dependance on the openness of the porosity of the filter. A further reduction in the use of filtering aids is thus attained.

Of course, in addition to inoculation, there is the possibility of carrying out a base deposition of a filtering aid. This base deposition has a significantly thinner layer thickness, however, than was necessary for the previously known deposition filters. Cellulose or a coarse corn meal, for example, are suitable for the base deposition; cellulose is suitable for the inoculation. The deposition using diatomaceous earth used previously is thus no longer necessary. Diatomaceous earth is a health hazard which necessitates very high disposal costs.

Furthermore, the advantage in using cellulose or coarse corn meal as the inoculation or deposition material is that the material used can be disposed of thermally. The disposal costs are thus reduced considerably.

These and other features of the preferred embodiments of the invention also proceed from the description and the drawings as well as from the claims, whereby the individual features can be realized individually or together in the form of sub-combinations in embodiments of the invention and in other contexts and can represent advantageous embodiments which can be protected in and of themselves, for which protection is claimed here.

BRIEF DESCRIPTION OF THE DRAWINGS

The invention is explained below in further detail with reference to a working example shown in the accompanying drawing which is schematic representation of an installation for filtering cooling lubricants.

DETAILED DESCRIPTION OF PREFERRED EMBODIMENTS

The FIGURE shows the schematic construction of a facility for cleaning liquid cooling lubricants. The cooling lubricant which is supplied by machine tools (not shown here) and which is loaded with shavings and contaminants is introduced through lines 10, 11, 12 into a dirty container 13. From this dirty container 13 the liquid passes through line 14 and a pump 15 to a deposition filter installation 16. Typically, several cartridge filters are located in a deposition filter installation. A deposition filter installation of this type is known, for example, from DE 29 08 625 A1.

The cleaned liquid leaves the installation through line 17 and then can be supplied to the machine tools once again through a clean tank and supplemental pumps which optionally may be provided. A line 18 and a valve 19 are arranged at the discharge opening of the deposition filter installation 16. When the valve 19 is opened, the dirt and the filtering aid are conveyed into a container 20.

A filtering aid for base deposition, for example cellulose, travels from a container 21 to a transport device 22. This transport device has a metering device 23 and a screw conveyor device 24. From here, the filtering aid is measured into a container 25 which is filled with oil or suspension. The filtering aid and the liquid are mixed with a stirring device 26. This means that when the filter is started, initially the base deposition is prepared and is pumped to the filter. After the deposition of the base is completed, the deposition filter installation is ready for operation. During the normal circulation through the filter, oil-based infusion substance 28 from the inoculation container 25 is added to the filtration circuit continuously or discontinuously through line 27 and valve together with and simultaneously with the circulation through the filter; that is, oil-based inoculant is introduced continuously or discontinuously into the filtration circuit with an inoculation pump 29. In order to avoid unnecessary energy consumption, this may advantageously be carried out by injecting the inoculant through pipeline 27 into pipeline 14.

As a result of the inoculation process, the dirty liquid pumped through the filter cartridges is continuously also mixed with the inoculation substance, such that a mixture composed of inoculated deposition material and contamination forms on the filter cartridges. Because the inoculation deposition substance is injected continuously or discontinuously during the ongoing filtration, the porosity of the deposits on the filter cartridges, and respectively the property of the coating, increases, thus enabling a very effective and high caliber filtration quality. Likewise, a considerable increase in the exposure time is achieved through the inoculation.

To form a base deposit, the base deposition medium is provided in a container 30, as shown in the figure, and is introduced from there into a transport device 31, comprised of a measuring device 32 and a screw conveyor device 33. The screw conveyor device feeds the base deposition medium into the container 34 in which oil or suspension is located. The base deposition material is mixed with the oil or suspension using the stirring device 35 and is introduced through line 36 and valve 37 into the deposition filtering device before a filtering process is begun. The base deposition medium thus deposits on the filter cartridges and forms a first filter layer.

As a result of the subsequent inoculation of the dirty liquid which is supplied, a better cooling lubricant material quality is achieved, meaning that the degree of purity of the cooling lubricants is increased.

What is claimed is:

1. A method for cleaning a liquid cooling lubricant comprising the steps of passing used cooling lubricant contaminated with dirt and metal particles from a metal processing facility through a filter device to obtain a cleaned cooling lubricant, and returning the cleaned cooling lubricant to the metal processing facility for reuse, wherein in a first step a mixture of cellulose filtering aid material and clean liquid cooling lubricant is fed to the filter to deposit a precoat layer on the filter, and in a second step the same mixture of cellulose filtering aid material and liquid cooling lubricant is added to contaminated cooling lubricant fed to the filter for filtration.

2. A method according to claim 1, wherein said liquid cooling lubricant is a mineral-oil based cooling lubricant.

3. A method according to claim 1, wherein the introduction o f filtering aid is carried out continuously during the filtration of the liquid cooling lubricant.

4. A method according to claim 1, wherein the introduction of filtering aid is carried out discontinuously during the filtration of the liquid cooling lubricant.

5. A method according to claim 1, wherein the introduction of filtering aid is effected such that the filter remains porous.

6. A method according to claim 1, wherein the filtering aid material for the base deposition is coarse corn meal.

7. A method according to claim 1, wherein cellulose is used as the filtering aid material, further comprising the step of disposing of used cellulose filter aid material by thermal disposal.

* * * * *